Sept. 10, 1940.　　　　A. CORY　　　　2,213,978
MECHANICAL MOVEMENT
Filed March 24, 1939
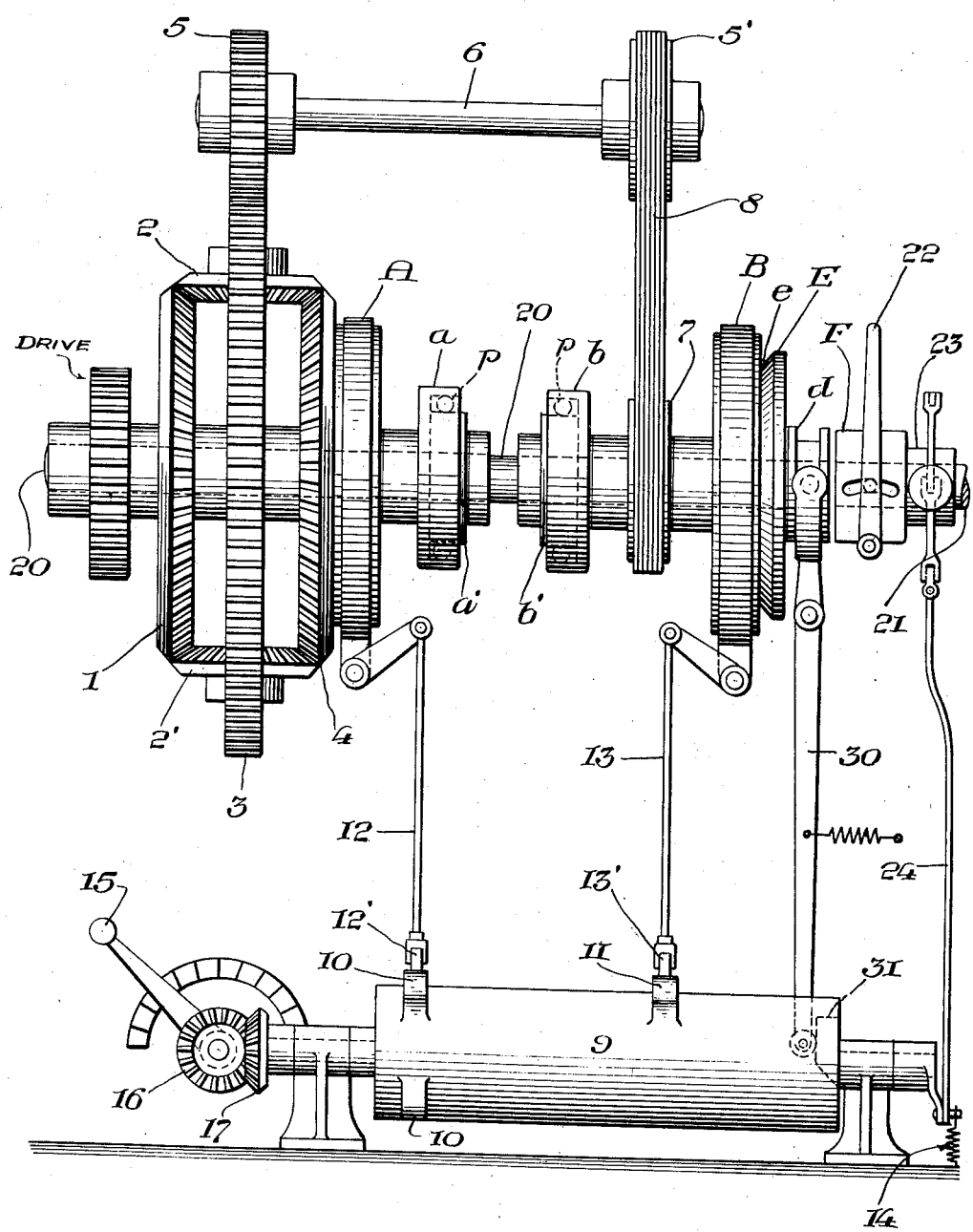
INVENTOR.
Anthony Cory
BY
G. Breed
ATTORNEY.

Patented Sept. 10, 1940

2,213,978

UNITED STATES PATENT OFFICE 2,213,978

MECHANICAL MOVEMENT

Anthony Cory, New York, N. Y.

Application March 24, 1939, Serial No. 263,837

18 Claims. (Cl. 74—260)

This invention relates to an improvement in mechanical movements and more particularly to that type known as differential change speed gearing and has for its object the change of speed by a system of gears between two elements, one of which is the driving element and the other a driven element of varied load necessitating such change of gears, the present invention being an improvement upon the construction shown and described in my Letters Patent No. 2,142,813 of January 3rd, 1939.

The principal object of the present invention is the provision of a simple, efficient and inexpensive gear system in which the change from one speed to another may be accomplished either automatically or by hand without disconnecting the driving and driven elements and, therefore, when applied to the gear shift mechanism of an automobile or the like, would render the use of a clutch unnecessary in changing from one speed to another.

A further object of the present invention is the provision of means in connection with the aforementioned gear shift mechanism by which it is possible for the operator to disconnect the automatic shift at any time and manually engage certain of the gears in any desired speed for the purpose of braking the machine.

In the accompanying drawing forming a part of this specification, the figure illustrates a plan view of this improved differential change speed gearing together with the operating means therefor.

Before explaining in detail the present improvement and mode of operation thereof, I desire to have it understood that the invention is not limited to the details of construction and arrangement of parts illustrated in the accompanying drawing since the invention is capable of other embodiments, and that the phraseology employed is for the purpose of description and not of limitation.

The present mechanism comprises driving means such as the gear designated in the drawing by the word "Drive" and which is adapted for connection in any suitable manner either directly or indirectly to driving means such as, for example, the motor of an automobile (not shown). This gear is mounted for independent rotation on a shaft 20 extending the entire length of the structure in the present instance although it may be mounted independently if desired and the various other units on separate shafts.

Secured in any suitable manner for rotation with the "drive" gear is a bevel gear 1 which is likewise mounted on the shaft 20 for independent rotation. This gear 1 is adapted to mesh with a pair or more of bevel pinions 2 and 2' having suitable bearings within a gear 3 which is likewise independently rotatable on the shaft 20.

A bevel gear 4 identical to bevel gear 1 and freely rotatable on the shaft 20 is in mesh with the bevel pinions 2 and 2'. Secured in any suitable manner to the gear 4 is a brake mechanism A comprising a pulley and brake which, in the present instance, is freely rotatable on the shaft 20. A ratchet mechanism is provided, one member $a$ of which is carried in any suitable manner by the brake mechanism and the other member $a'$ is secured to the shaft 20. This ratchet mechanism has pawls $p$ and is constructed in such manner that the pawls will act to overrun when the shaft is rotating at a greater speed than the gear 4.

The gears 1, 2, 2', 3 and 4, together comprise a unit otherwise known as a differential gear coupling and while I have described it in detail with certain types of gears, it is understood that any conventional type of differential gear coupling unit will serve the same purpose. The function of the gear coupling unit is that one gear is the driving gear and the other two gears the driven gears and, in this case, the gear 1 is the driving gear while the gears 3 and 4 are the driven gears. If the gear 1 is rotated in a certain direction and the gear 3 held against rotation, the gear 4 will rotate or be driven by the gear 1 at the same speed as the gear 1 but in the opposite direction. However, if the gear 4 is held against rotation while the gear 1 rotates, it will be found that the gear 3 rotates in the same direction as the gear 1 but at one-half the number of revolutions.

In the present structure it is desirable to connect the gear 3 with the shaft 20 so that it can be used to drive the shaft in the same direction as the gear 4. Therefore, I have provided suitable connecting means which includes a gear 5 in mesh with the gear 3. This gear is mounted on one end of a shaft 6 and on the other end is mounted a gear 5' having the same size and proportion as the gear 5. This gear 5' is connected with a gear 7 freely rotatable on the shaft 20 by any suitable means and in the drawing a chain 8 is provided for this purpose. This gear 7 is again connected with the shaft 20 by means similar to the brake means connecting the gear 4 with the shaft and comprises the brake B and the ratchet and pawl mechanism $b$, $p$ and $b'$. In order to simplify the parts and reduce the size of the apparatus, the ratchet mechanism and brake have been placed on opposite sides of the gear in the present instance.

The brakes A and B are provided with suitable means for their application and in this case I have shown a rotary drum 9 provided with cams 10 and 11 in position to engage links 12 and 13 connected in any suitable manner to the brakes A and B. These links are provided with rollers 12' and 13' for engagement with the cams 10 and 11. Suitable springs (not shown) are connected with the links to hold them against operation until the rollers 12' and 13' are engaged by the cams 10 and 11.

The cam drum 9 is normally maintained in position to hold the brakes in their released position by means such as the spring 14. For manual operation of the drum 9, a lever 15 is provided which has a bevel gear 16 in mesh with a similar gear 17 carried by the drum.

Connecting the shaft 20 with a shaft 21 for engagement and disengagement thereof is a reverse clutch or gear box mechanism F adapted to enable the operator to utilize the reducing gear mechanism for either a forward or reverse drive since, obviously, the shaft 20 will always be rotated in the same direction and this gear box may be provided with a lever 22 for its operation. Should it be desired to operate the drum 9 automatically a governor 23 of the usual construction is secured to the shaft 21 and link connected with the drum 9 by links 24.

The operation of the device is as follows—

The clutch F is engaged to connect the shafts 20 and 21 and the drum 9 is rotated to the position where both brakes A and B are in released position. The "drive" gear is driving the gear 1 at a given speed and the gears 3 and 4 are being driven thereby and dividing the speed of the gear 1. Since, in this position of the brakes, both gears 3 and 4 are being driven, the two ratchet mechanisms $a, p, a'$ and $b, p, b'$ are rotating and driving the shaft 20 together or synchronously which, with the usual construction of differential couplings, results in a ratio of 3 to 1 or the equivalent of low speed.

The drum 9 is then rotated to engage the brake A stopping the gear 4 and permitting the gear 3 to be rotated by the gear 1 and the release from the driving mechanisms of this gear 4 permits the gear 3 to rotate at a greater speed or one-half the speed of the gear 1 which, in turn, drives the shaft through the gears 5, 5' and 7 and the ratchet mechanism $b, p, b'$ at a greater speed or at the equivalent of second speed.

Upon the next rotation of the drum 9, the brake B is applied and the brake A released which stops all the driven gears including the gear 3 of one set and permits the driving gear 1 to drive the gear 4 at the speed of the driving gear and this, through the ratchet mechanism $a, p, a'$ drives the shaft 20 at the speed of the driving gear or at a ratio of 1 to 1 which is the equivalent of high speed.

It will be obvious to one skilled in the art that the ratios herein given are for the purpose of illustration and any desired change may be made through the substitution of different sizes of gears but, regardless of the ratio, the device is capable of three independent speeds.

The change in speed from one ratio to the other may be accomplished either by the use of the hand lever 15 or by the governor 23 which is controlled by the speed of the shaft 21, either of which will cause the necessary rotation of the drum.

Obviously, with the aforementioned construction, the connection of the gears with the driven shaft by means of over-running clutch or pawl mechanisms, it would be impossible to apply any of the brakes to use the motor for braking purposes which is often desirable when a car is going down steep hills and to overcome this difficulty, I have provided a clutch E having its part $d$ located on the shaft 20 and adapted to rotate therewith and its part $e$ secured to the gear 7. This clutch is connected by means of a lever 30 to a cam shifter 31 carried by the drum 9. When the drum is rotated to engage the clutch E, it will be apparent that the shaft is driven directly and, therefore, acts as a direct connection with the motor and is the same as shifting positively into a lower speed and permits the engine to act as a brake on the car. At this time, the brake A is applied so that the drive is connected to the shaft only through the gear 3 and its associated gears.

It is to be understood that, by describing in detail herein any particular form, structure or arrangement, it is not intended to limit the invention beyond the terms of the several claims or the requirements of the prior art.

Having thus explained the nature of my said invention and described a way of constructing and using the same, although without attempting to set forth all of the forms in which it may be made or all of the modes of its use, I claim:

1. Power transmission mechanism comprising a driven shaft, driving means therefor comprising a single differential gear coupling unit and a gear unit between said coupling unit and the shaft, brake mechanism carried by a member of each of said units, means for selectively operating said brake mechanisms, ratchets carried by the driven shaft, and pawls carried by a member of each unit for rotation therewith whereby a different ratio of speed between the driving and driven means will be effected by the selective application and release of said brakes.

2. Power transmission mechanism comprising a driven shaft, driving means therefor comprising a single differential gear coupling unit and a gear unit between said coupling unit and the shaft, ratchet mechanism connecting each of said units with the shaft, brake mechanisms for each of said ratchet mechanisms, means for selectively operating said brake mechanisms, and means for automatically operating said brake mechanisms whereby a different ratio of speed between the driving and driven means will be effected by the selective application and release of said brakes.

3. Power transmission mechanism comprising a driven shaft, driving means therefor comprising a single differential gear coupling unit and a gear unit between said coupling unit and the shaft, brake mechanism carried by a member of each of said units, means for selectively operating said brake mechanisms, ratchets carried by the driven shafts, pawls carried by a member of each unit for rotation therewith whereby a different ratio of speed between the driving and driven means will be effected by the selective application and release of said brakes, and means for connecting said driven shaft and driving means independently of said ratchet mechanism.

4. Power transmission mechanism comprising a driven shaft, driving means therefor comprising a single differential gear coupling unit and a gear unit between said coupling unit and the shaft, means connecting a member of each of the units with the shaft, brake mechanism for each of said connecting means, and means for selectively operating said brake mechanisms, said connecting means comprising pawls adapted to rotate with one member of each unit and a ratchet secured to the shaft whereby a different ratio of speed between the driving and driven means will be effected by the selective application and release of said brakes.

5. Power transmission mechanism comprising a driven shaft, driving means therefor comprising a single differential gear coupling unit and a gear unit between said coupling unit and shaft, means connecting a member of each of the units with the shaft, brake mechanism for each of said connecting means, means for selectively operating said brake mechanism, and means for connecting said driven shaft and driving means independently of said first connecting means.

6. Power transmission mechanism comprising driving and driven means and therebetween a single differential coupling unit and a unit between said coupling unit and the driven means, means connecting a member of each unit with the driven means for synchronously driving said driven means, and means for selectively stopping each of said connecting means and its member whereby the speed ratio between the driving and driven means will be changed.

7. Power transmission mechanism comprising driving and driven means and therebetween a single differential coupling unit having a driving member and a pair of driven members, means comprising ratchet mechanism connecting each of the driven members of said coupling to the driven means for synchronously driving said driven means, and means for selectively stopping each of said driven members whereby the speed ratio between the driving and driven means will be changed.

8. Power transmission mechanism comprising driving and driven means and therebetween a single differential coupling unit, means connecting both driven members of said coupling with the driven means for synchronously driving the driven means, and means for selectively stopping each of said driven members whereby, on the stoppage of either of said members, the speed ratio between the driving and driven means will be changed.

9. Power transmission mechanism comprising driving and driven means, a single differential coupling unit, a plurality of ratchet mechanisms connecting the driven gears of said unit with the driven means for synchronously driving the driven means, brake mechanism for each ratchet mechanism, and means for selectively engaging and disengaging any of said braking mechanisms whereby the speed ratio between the driving and driven means will be changed.

10. Power transmission mechanism comprising driving and driven means, a single differential coupling unit, a plurality of ratchet mechanisms connecting the driven gears of said unit with the driven means for synchronously driving the driven means, brake mechanism for each ratchet mechanism, and means for selectively engaging and disengaging each of said braking mechanisms whereby the speed ratio between the driving and driven means will be changed, said means comprising a cam drum having a plurality of cams thereon in position selectively to engage said brake mechanisms.

11. Power transmission mechanism comprising driving and driven means, a single differential coupling unit, a plurality of ratchet mechanisms connecting the driven gears of said unit with the driven means for synchronously driving the driven means, brake mechanism for each ratchet mechanism, means for selectively engaging and disengaging each of said braking mechanisms whereby the speed ratio between the driving and driven means will be changed, said means comprising a cam drum having a plurality of cams thereon in position selectively to engage said brake mechanisms, and means for automatically rotating said cam drum.

12. Power transmission mechanism comprising driving and driven means, a single differential coupling unit, a plurality of ratchet mechanisms connecting the driven gears of said unit with the driven means for synchronously driving the driven means, brake mechanism for each ratchet mechanism, means for selectively engaging and disengaging each of said braking mechanisms whereby the speed ratio between the driving and driven means will be changed, said means comprising a cam drum having a plurality of cams thereon in position selectively to engage said brake mechanisms, and means for positively engaging the driving and driven means independently of said ratchet mechanism.

13. Power transmission mechanism comprising driving and driven means, and therebetween a single differential coupling unit having a driving gear and a pair of driven gears, means comprising ratchet mechanism connecting each of the driven gears of said coupling to the driven means for synchronously driving said driven means, and means for selectively stopping each of said driven gears whereby on the stopping thereof the speed ratio between the driving and driven means will be changed, said last means comprising a plurality of brakes.

14. Power transmission mechanism comprising driving and driven means, and therebetween a single differential coupling unit having a driving gear and a pair of driven gears, means comprising ratchet mechanism connecting each of the driven gears of said coupling to the driven means for synchronously driving said driven means, means for selectively stopping each of said driven gears whereby on the stopping thereof the speed ratio between the driving and driven means will be changed, said last means comprising a plurality of brakes, and means for automatically engaging and disengaging said brakes.

15. Power transmission mechanism comprising driving and driven means, and therebetween a single differential coupling unit having a driving gear and a pair of driven gears, means comprising ratchet mechanism connecting each of the driven gears of said coupling to the driven means for synchronously driving said driven means, means for selectively stopping each of said driven gears whereby on the stopping thereof the speed ratio between the driving and driven means will be changed, said last means comprising a plurality of brakes, and means for automatically engaging and disengaging said brakes, said means comprising a governor.

16. Power transmission mechanism comprising driving and driven means, and therebetween a single differential coupling unit having a driving gear and a pair of driven gears, means comprising ratchet mechanism connecting each of the driven gears of said coupling to the driven means for synchronously driving said driven means, means for selectively stopping each of said driven gears whereby on the stopping thereof the speed ratio between the driving and driven means will be changed, said last means comprising a plurality of brakes, and means for engaging and disengaging each of said brakes.

17. Power transmission mechanism comprising driving and driven means, and therebetween a single differential coupling unit having a driving gear and a pair of driven gears, means comprising ratchet mechanism connecting each of the driven gears of said coupling to the driven means for synchronously driving said driven means, means for selectively stopping each of said driven gears whereby on the stopping thereof the speed ratio between the driving and driven means will be changed, said last means comprising a plurality of brakes, means for engaging and disengaging each of said brakes, and means for positively connecting the driving and driven means independently of said previous connecting means.

18. Power transmission mechanism comprising driving and driven means, and therebetween a single differential coupling unit having a driving gear and a pair of driven gears, means comprising ratchet mechanism connecting each of the driven gears of said coupling to the driven means for synchronously driving said driven means, means for selectively stopping each of said driven gears whereby on the stopping thereof the speed ratio between the driving and driven means will be changed, said last means comprising a plurality of brakes, means for engaging and disengaging each of said brakes, and means for positively connecting the driving and driven means independently of said previous connecting means, said last means comprising a clutch connecting one of the driven gears with the driven means whereby said driven means will be driven through the clutch at a reduced speed.

ANTHONY CORY.